United States Patent [19]
Chow et al.

[11] Patent Number: 5,947,813
[45] Date of Patent: Sep. 7, 1999

[54] DOUBLE BARREL AIR OUTLET ASSEMBLY

[75] Inventors: Derrick Wayban Chow, Whitby; Robert Charles Templin, Kanata, both of Canada

[73] Assignee: Collins & Aikman Plastics, Inc., Troy, Mich.

[21] Appl. No.: 09/130,077

[22] Filed: Aug. 7, 1998

[51] Int. Cl.[6] .................................................. B60H 1/34
[52] U.S. Cl. ........................................ 454/155; 454/316
[58] Field of Search .................................. 454/155, 313, 454/316

[56] References Cited

U.S. PATENT DOCUMENTS

| | | | |
|---|---|---|---|
| 2,974,581 | 3/1961 | Goettl | 98/40 |
| 3,045,576 | 7/1962 | Goettl | 98/40 |
| 3,572,233 | 3/1971 | Bar, et al. | 98/2 |
| 3,942,419 | 3/1976 | Beach | 98/40 A |
| 4,006,673 | 2/1977 | Meyer et al. | 98/40 A |
| 4,345,510 | 8/1982 | Sterett | 98/40 VM |
| 4,686,890 | 8/1987 | Stouffer et al. | 98/2 |
| 4,702,156 | 10/1987 | Sano | 98/40.24 |
| 4,938,122 | 7/1990 | Ziemba | 98/2 |
| 5,056,420 | 10/1991 | Komori et al. | 98/2 |
| 5,569,076 | 10/1996 | Sudak et al. | 454/155 |
| 5,588,910 | 12/1996 | Hutter et al. | 454/154 |

Primary Examiner—Harold Joyce
Assistant Examiner—Derek S. Boles
Attorney, Agent, or Firm—Bliss McGlynn, P.C.

[57] ABSTRACT

An outlet assembly for providing universal directability of air therethrough. The assembly includes a housing with a first barrel pivotally connected in the housing about a first axis A. A second barrel is pivotally connected within the first barrel about a second axis B perpendicular to the first axis A. Fixed position louvers are connected to the second barrel.

19 Claims, 2 Drawing Sheets

DOUBLE BARREL AIR OUTLET ASSEMBLY

BACKGROUND OF THE INVENTION

1. Field of the Invention

The invention relates to an air outlet assembly generally used for vehicles, and more particularly, to an outlet assembly allowing universal directability of air.

2. Description of the Related Art

Air outlets are commonly utilized in heating, ventilation and air conditioning systems of automobiles. Various types of air outlets are provided depending upon special functions, air directability and design constraints within the vehicle. There are air outlet assemblies which use a single barrel pivotable about a single axis within a housing. Louvers are connected to the barrel and pivot about a second axis to provide additional directionability. Such assemblies are illustrated in U.S. Pat. No. 4,345,510, issued Aug. 24, 1982 in the name of Sterett, and U.S. Pat. No. 4,702,156, issued Oct. 27, 1987 in the name of Sano.

Furthermore, there are air outlets with universal movement and include a spherical nozzle which may pivot within a spherical housing about one axis and a ring sliding along the housing about a second axis. Such an air outlet is illustrated in U.S. Pat. No. 4,006,673, issued Feb. 8, 1977 in the name of Meyer, et al.

Simplicity in design and manufacture have always been a driving force to decrease the expense of outlet assemblies, along with enhanced durability of the air outlet assemblies.

SUMMARY OF THE INVENTION

The invention is an outlet assembly for directing air in variable directions from an inlet through an outlet. The assembly comprises a housing having a housing opening therein. A first barrel is pivotally secured in the opening of the housing and pivotable about a first axis. The first barrel includes a cavity therein. A second barrel is pivotally secured within the cavity of the first barrel and is pivotal about a second axis perpendicular to the first axis. The second barrel includes a barrel opening therein and includes a plurality of fixed position louvers fixedly connected to the second barrel for providing a plurality of air passageways for directing air therethrough. Also included is the first barrel comprising a retainer portion connected to the housing and snaps on opposing sides thereof, and a bezel portion including arms with snaps for snapping to the retainer portion.

The outlet assembly allows for simplicity in manufacture by common molding practices while allowing durability by utilizing pivot points to obtain universal directability rather than sliding members or multiple movable louvers.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
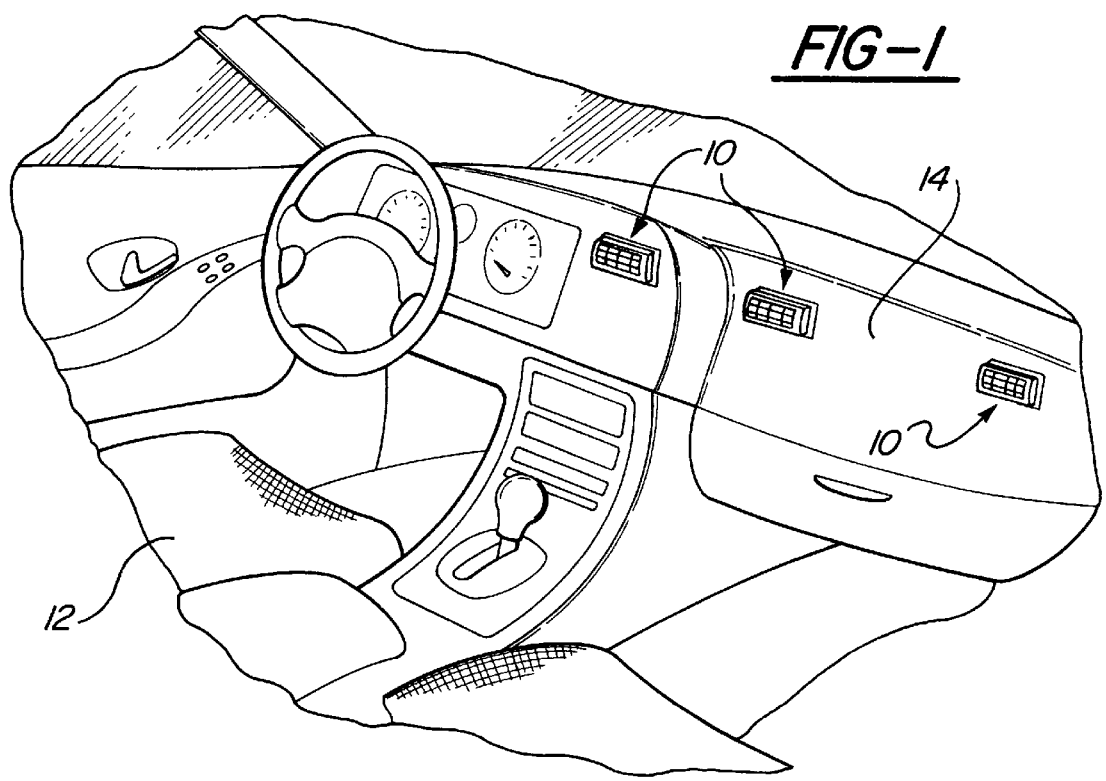
FIG. 1 is a perspective view of the interior of a vehicle utilizing the outlet assembly of the invention.
Figure 2:
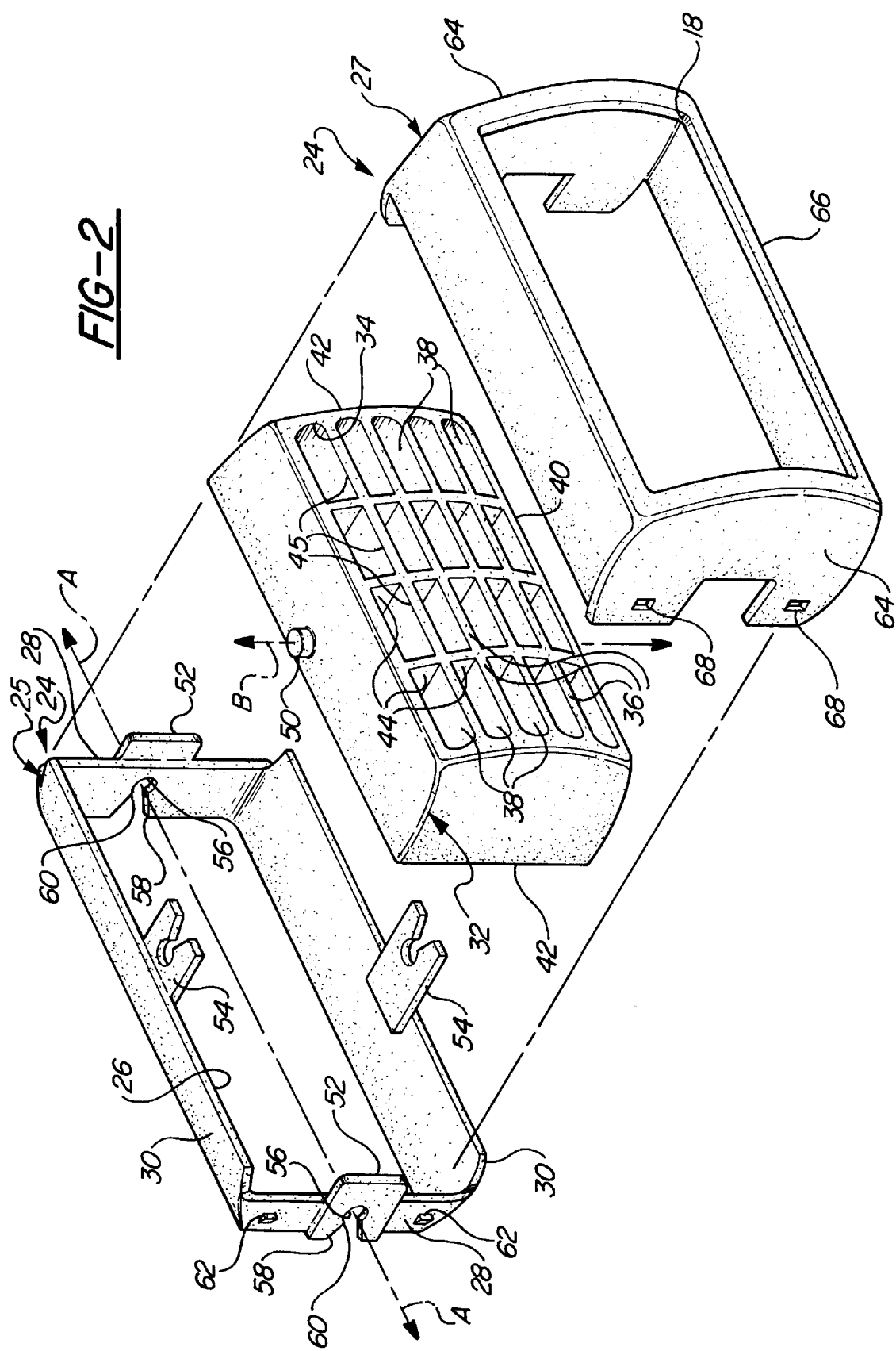
FIG. 2 is an exploded view of the outlet assembly of the invention.

An air outlet assembly 10 is shown as used in a vehicle 12 on the instrument panel 14 in FIG. 1. The air outlet assembly 10 is more specifically illustrated in FIG. 2. The air outlet assembly 10 allows for directing air in variable universal directions from an inlet 16 to an outlet 18 in a vehicle ventilating system.

The air outlet assembly 10 is secured to a housing 20 having a housing opening 22 therein. The housing 20 may be comprised of an instrument panel 14 or a separately molded member secured within the instrument panel 14. The housing opening 22 is generally rectangular in shape.

The air outlet assembly 10 also includes a first barrel 24 pivotally secured in the housing opening 22 of the housing 20 and pivotal about a first axis A. The first barrel 24 includes a cavity 26 therein. The first barrel 24 is rectangular in shape, and the cavity 26 is also rectangular in shape. The first barrel 24 includes first and second pairs of opposing side walls 28, 30, e.g., four side walls, extending longitudinally between the inlet 16 and outlet 18. The first barrel 24 is comprised of a separate retainer portion 25 and a separate bezel portion 27.

The retainer portion 25 is comprised of a generally rectangular frame providing a portion of the first and second pair of opposing side walls 28, 30. On the first pair of opposing side walls 28 of the retainer portion 25 are included snaps 62 for receiving the bezel portion 27 thereagainst. The bezel portion 27 includes arms 64 extending from a front face 66 thereof to the retainer portion 25. The arms 64 include mating snaps 68 on the interior surface thereof to mate with the retainer snaps 62 to mechanically lock the bezel portion 27 to the retainer portion 25. The front face 66 of the bezel portion 27 is tapered inwardly from the side walls 28, 30.

The air outlet assembly 10 includes a second barrel 32 pivotally secured within the cavity 26 of the first barrel 24 and pivotal about a second axis B perpendicular to the first axis A. The second barrel 32 includes a barrel opening 34 therein. The second barrel 32 includes a plurality of fixed position louvers 36 fixedly connected to the second barrel 32 for providing a plurality of air passageways 38 directing air therethrough. The second barrel 32 and the barrel opening 34 are generally rectangular in shape. The second barrel 32 includes perimeter walls 40, 42 forming the barrel opening 34 and having a longitudinal length extending between the inlet 16 and outlet 18.

In assembly, the retainer portion 25 is snapped or locked into the housing 20 at the first pair of pivot pins 48. Thereafter, the second barrel 32 is snapped or locked onto the retainer portion 25 at the second pair of pivot pins 50. Lastly, the bezel portion 27 is snapped onto the retainer portion 25 over the second barrel 32.

Each of the plurality of louvers 36 forming the air passageways 38 are generally parallel to one another. The second barrel 32 also includes a plurality of interior, parallel walls 44, 45 extending in the barrel opening 34 to establish the louvers 36 and air passageway 38. The plurality of parallel walls 44, 45 include a plurality of vertical walls 44 and a plurality of horizontal walls 45 intersecting the vertical walls 44 to provide the louvers 36 and air passageways 38. The parallel walls 44, 45 may extend a part of the distance of the longitudinal length of the perimeter walls 40, 42, or the entire distance for additional directability.

A knob, such as an ergonomic three-finger knob (not shown), may be fixedly connected on the exterior surface of the louvers 36 to allow adjustment of the second barrel 32 and the first barrel 24.

Figure 3:
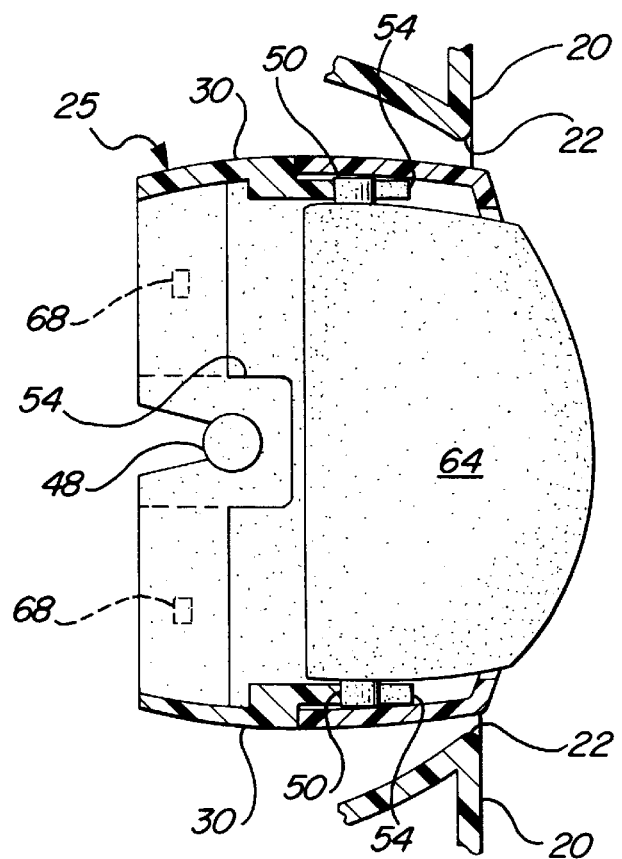
FIG. 3 is a top view of the outlet assembly of the invention with the surrounding structure shown in cross section.

The air outlet assembly 10 includes a first pair of opposing pivot pins 48, as shown in FIG. 3, connected between the housing 20 and the first barrel 24 along the first axis A to allow the first barrel 24 to pivot within the housing 20. Also included is a second pair of opposing pivot pins 50 connected between the first barrel 24 and the second barrel 32 along the second axis B to allow the second barrel 32 to pivot with respect to the first barrel 24. In general, the perpendicular pivoting of the first barrel 24 and the second barrel 32 provides for the resultant universal directionability of the air out of the housing 20.

In the preferred embodiment, the first pair of opposing pivot pins 48 are fixedly connected to the housing 20. The first pair of opposing sidewalls 28 of the retainer portion 25 of the first barrel 24 include pin receptacles 52 for receiving the first pair of opposing pivot pins 48 therein. It may be appreciated by those skilled in the art to transpose the first pair of opposing pivot pins 48 and the pin receptacles 52 as is appropriate per the specific design of the housing 20 and/or the instrument panel 14.

The second pair of opposing pivot pins 50 are fixedly connected to the second barrel 32 in the preferred embodiment at the perimeter walls 40. The second pair of opposing side walls 30 of the retainer portion 25 of the first barrel 24 provide pin receptacles 54 therein for receiving the pivot pins 50. The design of the pivot pins 48, 50 are similar between the housing 20 and the second barrel 32, along with the pin receptacles 52, 54. The pivot pins 48, 50 comprise a generally short cylindrical member. The pin receptacles 52, 54 include partial circular openings 56 and tapered walls 58 for guiding the pivot pins 48, 50 into the partial circular openings 56. Flanges 60 adjacent the openings 56 provide for locking the pivot pins 48, 50 therein. The flanges 60 allow some flexing to allow insertion of the pivot pins 48, 50 and locking of the pivot pins 48, 50 therein.

In the preferred embodiment, a first barrel 24 and second barrel 32 are molded of plastic material. The receptacles 52, 54 and pivot pins 48, 50 are integrally molded with the respective first barrel 24, second barrel 32 and housing 20. The snaps 62, 68 are also integrally molded to the retainer portion 25 and bezel portion 27. Furthermore, the knob 46 and louvers 36 are integrally molded with the second barrel 32.

In operation, the first barrel 24 can be pivoted about axis A to selectively direct air up and down. The second barrel 32 can be pivoted about axis B to selectively direct air side to side.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. An outlet assembly for directing air in variable directions from an inlet through an outlet, said assembly comprising:

a housing having a housing opening therein;
  a first barrel pivotally secured in said housing opening of said housing, and pivotal about a first axis, said first barrel including a cavity therein; and
  a second barrel pivotally secured within said cavity of said first barrel and pivotal about a second axis perpendicular to said first axis, said second barrel including a barrel opening therein and including a plurality of fixed position louvers fixedly connected to said second barrel for providing a plurality of air passageways for directing air therethrough.

2. An outlet assembly as set forth in claim 1 wherein each of said plurality of air passageways are parallel to one another.

3. An outlet assembly as set forth in claim 1 wherein said second barrel includes perimeter walls forming said barrel opening and having a longitudinal length extending between said inlet and said outlet.

4. An outlet assembly as set forth in claim 3 wherein said second barrel includes a plurality of parallel interior walls extending in said second barrel to provide said louvers and said air passageways.

5. An outlet assembly as set forth in claim 4 wherein said plurality of parallel interior walls include a plurality of vertical walls and a plurality of horizontal walls intersecting said vertical walls to provide said louvers.

6. An outlet assembly as set forth in claim 1 wherein said housing opening is rectangular in shape, and said first barrel is rectangular in shape.

7. An outlet assembly as set forth in claim 6 wherein said cavity is rectangular in shape, and said second barrel is rectangular in shape.

8. An outlet assembly as set forth in claim 1 further including a first pair of opposing pivot pins connected between said housing and said first barrel along said first axis to allow said first barrel to pivot within said housing.

9. An outlet assembly as set forth in claim 8 further including a second pair of opposing pivot pins connected between said first barrel and said second barrel along said second axis to allow said second barrel to pivot with respect to said first barrel.

10. An outlet assembly as set forth in claim 8 wherein said first pair of opposing pivot pins are fixedly connected to said housing, said first barrel including first and second pairs of opposing side walls extending longitudinally between said inlet and outlet, and said first pair of opposing side walls including pin receptacles therein.

11. An outlet assembly as set forth in claim 10 wherein said pin receptacles include a partial circular opening and tapered walls for guiding said pivot pins into said partial circular opening and locking said pivot pins therein.

12. An outlet assembly as set forth in claim 9 wherein said second pair of opposing pivot pins are fixedly connected to said second barrel, said first barrel including pin receptacles in said second pair of opposing side walls for receiving said second pair of opposing pivot pins.

13. An outlet assembly as set forth in claim 12 wherein said pin receptacles include a partial circular opening and tapered walls for guiding said pivot pins into said partial circular opening and locking said pivot pins therein.

14. An outlet assembly as set forth in claim 1 wherein said first and second barrels are formed of molded plastic material.

15. An outlet assembly as set forth in claim 1 wherein said second barrel and said louvers are molded integrally together.

16. An outlet assembly as set forth in claim 1 wherein said first barrel includes a separate retainer portion and a bezel portion snap fit to one another.

17. An outlet assembly as set forth in claim 9 wherein said first barrel includes a separate retainer portion and bezel portion, said retainer portion providing the pivot pin connection to said housing and said second barrel.

18. An outlet assembly as set forth in claim 16 wherein said bezel portion is snap fit to said retainer portion with said second barrel therebetween.

19. An outlet assembly for directing air in variable directions from an inlet through an outlet, said assembly comprising:

a housing having a housing opening therein;

a retainer portion connected to said housing and including a cavity therein and retainer snaps on opposing sides of said retainer portion;

a barrel pivotally secured to said retainer portion within said cavity and having fixed position louvers therein for directing air, and a bezel portion including arms extending therefrom and including mating snaps engageable with said retainer snaps for securing said bezel portion to said retainer portion with said barrel therebetween.

* * * * *